Patented June 19, 1951

2,557,089

UNITED STATES PATENT OFFICE 2,557,089

COMPOSITIONS COMPRISING A POLYMERIZED VINYL CHLORIDE RESIN PLASTICIZED WITH MONOALKYL DIARYL PHOSPHATE ESTERS

Harry R. Gamrath, St. Louis, and John Kenneth Craver, Webster Groves, Mo., assignors to Monsanto Chemical Company, St. Louis, Mo., a corporation of Delaware No Drawing. Application January 2, 1948, Serial No. 371

20 Claims. (Cl. 260—30.6)

The invention relates to novel compositions comprising monoalkyl diaryl phosphate esters and polymerized vinyl resins. More particularly, this invention relates to improved plasticized resin compositions containing certain monoalkyl diaryl phosphate esters and resins containing polymerized vinyl chloride. Resins containing polymerized vinyl chloride which are contemplated as being suitable for the purposes of this invention will be referred to broadly as "polyvinyl chloride resins" with the intention that "polyvinyl chloride resins" include polymerized vinyl chloride (polyvinyl chloride), copolymers of vinyl chloride and compositions containing both polymerized vinyl chloride and vinyl chloride copolymers.

Heretofore, resins such as polyvinyl chloride or copolymer resins such as polyvinyl chloride-acetate, which are normally rigid and brittle in their unplasticized state, have been commonly plasticized with compounds such as dioctyl phthalate, dibutyl sebacate and tricresyl phosphate, and films and sheets formed therefrom possess, in addition to other desirable properties, a durability and flexibility affording them extensive utility as materials for the fabrication of shoes, handbags, seat and cushion coverings, shower curtains and coated fabrics. For many of these uses, it has become necessary and highly desirable that a single plasticizer when incorporated with a polyvinyl chloride resin will produce a plastic composition which will possess the three essential characteristics of low-temperature flexibility, low volatility losses of the plasticizer and non-inflammability, whereas the plasticized compositions known and used up to the present time have been deficient in at least one of these three essential characteristics. In practical use, these articles of manufacture are oftentimes subjected to the freezing temperatures of winter weather and it is necessary that these sheets and films retain their flexibility characteristics at these temperatures. While compositions plasticized with dioctyl phthalate and dibutyl sebacate retain their flexibility at low temperatures, these plasticizers have the undesirable quality of being inflammable. In addition, dibutyl sebacate is unsatisfactory as a plasticizer for polyvinyl chloride resin compositions because of its high volatility. On the other hand, when tricresyl phosphate, which is a very good plasticizer from the standpoint of low volatility and non-inflammability, is used to plasticize polyvinyl chloride resins the compositions rapidly lose their flexibility at cooler temperatures and become stiff and hard at freezing temperatures. Although the low-temperature flexibility characteristics of compounds plasticized with tricresyl phosphate are improved to some extent by the use of a secondary plasticizer such as dibutyl phthalate, the compositions are unsatisfactory for many uses because of the high volatility and the inflammability of the dibutyl phthalate. The use of triphenyl phosphate as a plasticizer for polyvinyl chloride resins is not desirable for the reason that triphenyl phosphate is incompatible with polyvinyl chloride resins and a secondary plasticizer must be employed to facilitate compatibility. While trioctyl phosphate is also useful as a plasticizer for polyvinyl chloride resins, the high volatility of trioctyl phosphate is objectionable.

In view of this state of the art it has become highly desirable that a plasticizer be discovered for polyvinyl chloride resin compositions which would not only insure good low-temperature flexibility characteristics but would also insure retention of the plasticizer at higher temperatures, and in addition, inasmuch as polyvinyl chloride resin compositions are being developed for coatings for textiles to be fabricated into clothing, drapes and furniture coverings, as a safety precaution and a fire prevention measure, it is most desirable that the plasticized compositions be non-inflammable. It is most desirable to have a plasticizer which when in combination with polyvinyl chloride resins will produce compositions having the combination of properties of low-temperature flexibility, low volatility losses and non-inflammability.

It is an object of this invention to provide improved and novel polyvinyl chloride resin compositions. A further object is to provide novel plasticized compositions comprising polyvinyl chloride resins and certain monoalkyl diaryl phosphate esters. A still further object is to provide plasticized polymerized vinyl chloride resin compositions wherein a single plasticizer, when in combination with the polyvinyl chloride resin, produces compositions having at least the three highly desirable characteristics of low-temperature flexibility, low volatility losses of plasticizer and non-inflammability. Further objects will be apparent to those skilled in the art from the following description and claims.

According to the present invention, generally stated, when polymerized vinyl resins, particularly polymerized vinyl chloride and vinyl chloride copolymers, are plasticized with any monoalkyl diaryl phosphate ester selected from monoalkyl diphenyl phosphate esters and monoalkyl dicresyl phosphate esters, wherein the monoalkyl groups contain at least 6 and not more than 12 carbon atoms, new compositions are formed which possess a group of desirable properties not heretofore obtainable with the formerly used plasticizers.

According to one embodiment of this invention, plastic compositions may be prepared comprising a monoalkyl diaryl phosphate ester of this invention and any vinyl halide polymer or vinyl halide copolymer which is normally valued for its elastomeric properties when plasticized. Vinyl halide polymers and copolymers which are most commonly known are those containing vinyl chloride although the monoalkyl diaryl phosphates of this invention may equally well be used to form plastic compositions from other vinyl halides such as vinyl fluoride polymers and copolymers. Polymerized or copolymerized vinyl chloride resin compositions, which are known to those skilled in the art as being elastomeric when plasticized and are valued for their many desirable and useful characteristics, are illustrated by polyvinyl chloride, polyvinyl chloride-acetate, and copolymers of polyvinyl chloride with methyl methacrylate, diethyl maleate or vinylidine chloride. According to another embodiment of this invention, when polyvinyl chloride resins, particularly polyvinyl chloride and polyvinyl chloride copolymers, are plasticized with the monoalkyl diaryl phosphates of the invention, compositions result which exhibit the desirable combination of excellent low-temperature flexibility characteristics, low volatility losses of plasticizer and non-inflammability; and, in addition, the compositions of this invention possess improved resistance to the absorption of oil. Prior to the present invention, polyvinyl resins plasticized with other known plasticizers which impart good low-temperature flexibility frequently resulted in compositions possessing poor oil absorption resistance. However, compositions plasticized with the monoalkyl diaryl phosphates of the invention possess excellent low-temperature flexibility characteristics and have improved resistances to oil absorption.

Monoethyl diphenyl phosphate and monomethyl diphenyl phosphate have been disclosed in the art as plasticizers for cellulose esters. However, when it was attempted to use these esters with polyvinyl chloride or copolymers of polyvinyl chloride, the esters decomposed at the working temperatures of the roll mills and, therefore, there was no indication of the utility of this type of phosphate ester as a plasticizer for polyvinyl chloride resins or copolymer resins of polyvinyl chloride.

While, according to this invention, plastic compositions may be prepared from various polyvinyl chloride resins and the monoalkyl diaryl phosphates as hereinbefore described, the invention is particularly applicable to compositions containing polyvinyl chloride and copolymers of polyvinyl chloride such as polyvinyl chloride-acetate and polyvinyl chloride-vinylidene chloride. While the properties of individual compounds as plasticizers in specific compositions will be shown in examples appearing hereinafter, the plasticizers of this invention are illustrated by the following compounds, although it is not intended that this invention be limited to the following compounds:

Hexyl dicresyl phosphate
2-ethylbutyl diphenyl phosphate
2-methylpentyl dicresyl phosphate
n-Hexyl diphenyl phosphate
Octyl dicresyl phosphate
2-ethylhexyl dicresyl phosphate
Iso-octyl dicresyl phosphate
n-Octyl diphenyl phosphate
2-ethylhexyl diphenyl phosphate
Octyl diphenyl phosphate
Iso-octyl diphenyl phosphate
Nonyl diphenyl phosphate
Trimethylhexyl diphenyl phosphate
Nonyl dicresyl phosphate
n-Decyl diphenyl phosphate
Decyl dicresyl phosphate
Lauryl diphenyl phosphate
Dodecyl dicresyl phosphate In the above examples, the nonyl and dodecyl radicals may be derived, in addition to the conventional sources, from the polymerization products of olefins, such as propylene, or the dodecyl radical may be derived from the polymerization products of olefins such as butylene.

Suitable plasticizers for the purposes of this invention are those mixtures of monoalkyl diaryl phosphates wherein the alkyl residues are obtained from a mixture of monohydric alcohols derived from cocoanut oil of which substantially 60% of the alkyl radicals contain at least 8 and not more than 12 carbon atoms.

In the monoalkyl dicresyl phosphates which are intended to be used in the practice of this invention, the cresyl radical may be an ortho-cresyl, para-cresyl, or meta-cresyl, for example, octyl di-m-cresyl phosphate and octyl m-cresyl p-cresyl phosphate. In general, monoalkyl dicresyl phosphates wherein the cresyl substituents are derived from meta-cresol are preferred to monoalkyl dicresyl phosphates wherein the cresyl substituents are derived from ortho-cresol or para-cresol, as the ortho-cresyl derivatives tend toward increased toxicity, and the meta-cresyl derivatives have even better flexibilizing properties than the para-cresyl derivatives.

The monoalkyl diaryl phosphates of this invention may be prepared in the manner illustrated by the following examples, the description of the preparation of these and other esters being given in detail in our co-pending application, Serial No. 373, filed January 2, 1948, and Serial No. 374, filed January 2, 1948, which relate to this type of ester per se and copending applications Serial No. 38,194, filed July 12, 1948, now abandoned, and Serial No. 75,098, filed February 7, 1949, now Patent Number 2,504,121, which relate to the process for the preparation of these monoalkyl diaryl phosphate esters.

*2-ethylhexyl diphenyl phosphate*

Forty-six grams of $POCl_3$ are cooled with stirring to about 15° C. in a glass lined closed reaction vessel. Thirty-nine grams of 2-ethylhexanol which have been cooled to approximately 15° C. are added to the $POCl_3$ with continuous stirring and at a rate so as to maintain a reaction-mass temperature of about 15° C. The reaction mixture is agitated and the reaction temperature of 15° C. is maintained for one hour following the addition of all the 2-ethylhexanol, thereafter the temperature is allowed to rise to 25° C. and the stirring continued for another hour. The hydrogen chloride gas which is evolved from the reaction is continuously removed by means of applying a vacuum to the reaction vessel. After the reaction between the 2-ethylhexanol and the POCl₃ and the removal of the hydrogen chloride have been completed, the reaction mixture containing 2-ethylhexyl phosphoryl dichloride is transferred to a reactor containing 250 g. of an aqueous solution, cooled to 0° C., having a composition of 32% sodium phenate. The 2-ethylhexyl phosphoryl dichloride is added to the aqueous sodium phenate solution at such a rate as to maintain a temperature below 5° C. After all the 2-ethylhexyl phosphoryl dichloride has been added to the aqueous sodium phenate solution, the reaction mixture is agitated for an hour and then, with continuous stirring, allowed to warm up to room temperature. The mixture is then allowed to stand until an ester layer and an aqueous layer form and the crude ester layer is then separated from the aqueous layer. The crude ester is given successive washes with 2% NaOH solution and water thereby removing the unreacted phenol and partial esters, and reducing the alkalinity of the mass until it is acid to phenolphthalein, and then further refined in accordance with the usual methods well known to those skilled in the art of refining phosphate esters. The yield, based on POCl₃, was 91%.

The 2-ethylhexyl diphenyl phosphate prepared in the above manner had the following properties:

Sp. gr. 25/25° C. _____ 1.090
$N_D^{25}$ _____ 1.510
Boiling point at 5 mm _____ Approx. 232° C.
Melting point _____ Below —30° C.
Color _____ Nearly water white

2-ethylhexyl dicresyl phosphate 44.3 g. of POCl₃ are cooled with stirring to about 10° C. in a glass lined closed reaction vessel. 37.6 g. of 2-ethylhexanol are cooled to approximately 15° C. and added to the POCl₃ with continuous stirring and at a rate so as to maintain a reaction temperature of about 15° C. The reaction mixture is agitated and the reaction temperature of 15° C. is maintained for one hour following the addition of all the 2-ethylhexanol, thereafter the temperature is allowed to rise to approximately 25° C. and the stirring continued for another hour. The hydrogen chloride gas which is evolved from the reaction is continuously removed by means of applying a vacuum to the reaction vessel.

After the reaction between the 2-ethylhexanol and the POCl₃ and the removal of the hydrogen chloride have been completed, the reaction mixture containing 2-ethylhexyl phosphoryl dichloride is transferred to a reactor containing 246 g. of an aqueous solution, cooled to about 0° C. having a composition of 32.1% sodium cresylate. The 2-ethylhexyl phosphoryl dichloride is added to the aqueous sodium cresylate solution at such a rate as to maintain a temperature below 5° C. After all the 2-ethylhexyl phosphoryl dichloride has been added to the aqueous sodium cresylate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The crude ester is given successive washes with 2% NaOH solution and water thereby removing the unreacted cresol and partial esters, and reducing the alkalinity of the mass until it is acid to phenolphthalein, and then further refined in accordance with the usual methods well known to those skilled in the art of refining phosphate esters. The yield, based on POCl₃, was 90%.

The 2-ethylhexyl dicresyl phosphate which was prepared by the above method had the following properties:

Sp. gr. 25/25° C. _____ 1.064
Ref. index 25° C. _____ 1.507
Boiling point at 5 mm _____ Approx. 243° C.
Melting point _____ Below —30° C.
Color _____ Nearly water white

Lauryl diphenyl phosphate 139.5 g. of lauryl alcohol are cooled with stirring to about 20° C. in a glass lined closed reaction vessel. 115.1 g. of POCl₃ are cooled to approximately 20° C. and added to the POCl₃ with continuous stirring and at a rate so as to maintain a reaction temperature of 20° C. The reaction mixture is agitated and the temperature is slowly raised to 30 to 40° C. and maintained at that temperature for one hour following the addition of all the lauryl alcohol; thereafter, the temperature is raised to approximately 50° C. and the stirring continued for another hour. The hydrogen chloride gas which is evolved from the reaction is continuously removed by means of applying a vacuum to the reaction vessel.

After the reaction between the lauryl alcohol and the POCl₃ and the removal of the hydrogen chloride have been completed the reaction mixture containing lauryl phosphoryl dichloride is transferred to a reactor containing 573 g. of an aqueous solution, at a temperature below 5° C., having a composition of 32.9% sodium phenate. The lauryl phosphoryl dichloride is added to the sodium phenate solution at such a rate as to maintain a temperature below 5° C. After all the lauryl phosphoryl dichloride has been added to the alkaline sodium phenate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The separation of the lauryl diphenyl phosphate from the aqueous solution is not very sharp and, therefore, it is usually necessary to add sodium chloride to the reaction mixture to aid in the salting out of the ester. The crude ester is given successive washes with 2% NaOH solution and water thereby removing the unreacted phenol and partial esters, and reducing the alkalinity of the mass until it is acid to phenolphthalein, and then further refined in accordance with the usual methods well known to those skilled in the art of refining phosphate esters. The yield, based on POCl₃, was 90%.

The lauryl diphenyl phosphate which was prepared by the above method had the following properties:

Sp. gr. 26.5/15.5° _____ 1.038
$N_D^{25}$ _____ 1.4979
Melting point _____ Below —30° C.
Color _____ Nearly water white

Nonyl diphenyl phosphate 460.2 g. of POCl₃ are cooled with stirring to a temperature of 5 to 10° C. in a glass lined closed reaction vessel. 432.8 g. of a nonyl alcohol are cooled to 5 to 10° C. and are added to the POCl₃ with continuous stirring and at a rate so as to maintain a reaction-mass temperature of about 15° C. The reaction mixture is agitated and the temperature of the reaction mixture is allowed to come up to room temperature, thereafter the stirring is continued and the reaction mixture is placed under a vacuum (below 50 mm.) over a period of 2 hours thereby removing the hydrogen chloride gas which is evolved from the reaction.

An aqueous solution of sodium phenate is prepared by adding 592.2 g. of phenol to 840 cc. of water having dissolved therein 542.0 g. of 46.5% sodium hydroxide. The aqueous sodium phenate solution is cooled to 0° C. and the nonyl phosphoryl dichloride, prepared by the reaction of the nonyl alcohol and the POCl₃, is added to the aqueous sodium phenate solution at such a rate as to maintain a temperature below 5° C. After all of the nonyl phosphoryl dichloride has been added to the aqueous sodium phenate solution, the reaction mixture is agitated for a period of 3 hours and allowed to warm up to room temperature. When the agitation is stopped, the reaction mixture separates into an ester layer and an aqueous layer and the ester layer may be then separated from the aqueous layer by decantation. The ester layer is given successive washes with 2% NaOH solution and water thereby removing the unreacted phenol and partial esters and reducing the alkalinity of the mass until it is acid to phenolphthalein and then further refined in accordance with the usual methods well known to those skilled in the art of refining phosphate esters. The yield, based on POCl₃, was 90%.

The nonyl diphenyl phosphate prepared as above described had the following properties:

Specific gravity 25/25° C. __ 1.074
$N_D^{25}$ _____ 1.505
Melting point _____ Below —30° C.
Color _____ Nearly water white

Iso-octyl diphenyl phosphate 153.4 g. of POCl₃ are cooled with stirring to about 10° C. in a glass lined closed reaction vessel. 130.2 g. of iso-octyl alcohol are cooled to about 10° C. and added to the POCl₃ with continuous stirring and at a rate so as to maintain a reaction temperature of 10–14° C. The reaction mixture is continuously agitated and the temperature is gradually increased to 25° C. over a period of about one hour. While the stirring is continued the reaction mixture is placed under a vacuum (below 50 mm.) for another 1½ hours to remove the hydrogen chloride gas which is evolved from the reaction. The reaction mixture now contains predominantly iso-octyl phosphoryl dichloride.

An aqueous sodium phenate solution is prepared by adding 197.5 g. of phenol to 280 cc. of water having dissolved therein 180.7 g. of 46.5% sodium hydroxide. The sodium phenate solution is cooled to about 5° C. and the reaction mixture containing the iso-octyl phosphoryl dichloride is gradually added to the sodium phenate solution at such a rate as to maintain a temperature below 5° C. After all of the iso-octyl phosphoryl dichloride has been added to the sodium phenate solution, the temperature is allowed to rise to about 25° C. and the reaction mixture is stirred for an additional 3 hours. When the agitation is stopped, the reaction mixture separates into an ester layer and an aqueous layer and the ester layer is then separated from the aqueous layer by decantation. The ester layer is given successive washes with 2% NaOH solution and water thereby removing the unreacted phenol and partial esters and reducing the alkalinity of the mass until it is acid to phenolphthalein and then further refined in accordance with the usual methods well known to those skilled in the art of refining phosphate esters. The yield, based on POCl₃, was 89%.

The iso-octyl diphenyl phosphate prepared as above described had the following properties:

Specific gravity 25/25° C. __ 1.093
$N_D^{25}$ _____ 1.508
Melting point _____ Below —30° C.
Color _____ Nearly water white

2-methylpentyl dicresyl phosphate

The 2-methylpentyl phosphoryl dichloride was prepared by reacting 102.1 g. of 2-methylpentanol with 153.4 g. of phosphorus oxychloride in the same manner as was described for the preparation of iso-octyl phosphoryl dichloride.

The 2-methylpentyl phosphoryl dichloride was reacted with an aqueous sodium cresylate solution, prepared by adding 227 g. of cresol to 280 cc. of water having dissolved therein 180.7 g. of 46.5% sodium hydroxide, in the manner as was described for the preparation of iso-octyl diphenyl phosphate. The yield of 2-methylpentyl dicresyl phosphate, based on phosphorus oxychloride, was 90%.

The 2-methylpentyl discresyl phosphate prepared as above described had the following properties:

Specific gravity 25/25° C. ___ 1.081
$N_D^{25}$ _____ 1.511
Melting point _____ Below —30° C.
Color _____ Nearly water white The plasticized compositions comprising the polyvinyl resins and any monoalkyl diaryl phosphate plasticizer of this invention may be prepared by incorporating the plasticizer with the polyvinyl chloride resin to the extent of 20 to 60% of the plasticized composition. In the plasticized resin art, the plasticizer content of plasticized resinous compositions is frequently expressed on the basis of parts by weight of plasticizer per 100 parts of resin. Therefore, according to this manner of expression, the plasticized compositions of this invention may be expressed as containing 25 to 150 parts by weight of the monoalkyl diaryl phosphate plasticizer per 100 parts of the polyvinyl chloride resin. When the plasticizer content is below the lower limit of 25 parts of the monoalkyl diaryl phosphate plasticizer per 100 parts of resin, the flexibility characteristics of the resulting composition are seriously impaired, whereas a plasticizer content of 150 parts by weight of the monoalkyl diaryl phosphate plasticizer per 100 parts of resin approaches the upper limit of practical utility. Moreover, we have found that a plasticized composition having a monoalkyl diaryl phosphate plasticizer content of 25 to 50% are more desirable (i. e. about 30 to 100 parts by weight of a plasticizer of this invention per 100 parts of polyvinyl chloride resin), and plasticized polyvinyl chloride resin compositions having a monoalkyl diaryl phosphate plasticizer content of 30 to 45% (i. e. about 40 to 80 parts of a plasticizer of this invention per 100 parts of resin) are preferred compositions.

The plasticizer may be incorporated into the composition comprising the polyvinyl resin and the monoalkyl diaryl phosphate on a two-roll differential speed mill with a roll temperature of between 100 and 170° C., although a temperature of 120 to 140° C. was found to be quite satisfactory. The preferable rolling conditions for sheets are accomplished when the "hot" roll is maintained at 100–170° C. and the other roll is maintained at a temperature 15 to 20° C. below the temperature of the "hot" roll. Other means of mixing or kneading are well known and may be used provided a composition temperature is maintained between 100 and 170° C.

For purposes of comparison and indicating the outstanding results to be obtained by the use of the plasticizers described in this invention, the following table is presented showing the characteristics of polyvinyl chloride plasticized with the commonly used plasticizers in the amount of 40% of the total weight of the composition:

| Low Temp. Flexibility Point | Volatility, Per Cent Loss | Inflammability | Abrasion Resistance, mg./1,000 cy. | Oil Resistance, Per Cent Abs. |
|---|---|---|---|---|
| DOP [1]—38° C | 4.5 | .125 sq. cm./sec. | 158 | 19.6 |
| DBS [2]—70° C | 54.6 | Inflammable | 146 | ([4]) |
| TCP [3]—13° C | 0.7 | Non-inflam | 231 | 7.3 |

[1] DOP = Dioctyl phthalate.
[2] DBS = Dibutyl sebacate.
[3] TCP = Tricresyl phosphate.
[4] Leaches out 10%.

The following methods, which are well known to those persons skilled in the art of plasticizing resinous compositions, were used in testing all of the plastic compositions described:

The low temperature flexibility points, by the method described by Clash and Berg, Ind. Eng. Chem., 34, 1218 (1942). Volatility, samples containing 40% by weight of plasticizers were exposed for 24 hours at 105° C. in a Freas circulating oven, and the loss in weight was calculated as per cent loss of plasticizer. Inflammability, in accordance with ASTM D568–43, method B. Herein, throughout the specification and claims, the use of the term "non-inflammable" means that the plasticized composition did not, or will not, ignite when tested in accordance with ASTM 568–43, method B. Oil resistance, in accordance with ASTM D543–43, and the increase in weight was reported as per cent oil absorbed, and any loss in weight was reported as per cent plasticizer leached out; a Socony-Vacuum oil, meeting the specifications of the ASTM D543–43 test, was used in all of the oil resistance determinations. Abrasion resistance, a Taber abraser using H-22 wheels and 1,000 g. load was employed and results reported as mg. loss per 1,000 cycles.

The following examples illustrate the advantageous and unexpected results to be achieved by the use of the monoalkyl diaryl phosphates of the present invention in polyvinyl resin compositions, but it is not intended that this invention be limited by or to the examples:

Example I

Three parts by weight of polyvinyl chloride were intimately mixed with 2 parts of 2-ethyl-hexyl diphenyl phosphate plasticizer and this mixture was worked on a differential speed roll mill with one roll at a temperature of 140° C. until a homogeneous composition had been formed. A sheet of the composition was cut from the roll and after cooling a portion of this sheet was placed in a mold in a hydraulic press at a temperature of 325° F. and molded into a sheet of 0.040" thickness. Upon removing the molded sheet from the press, the following evaluation tests were run in accordance with the directions contained in the references hereinabove set out, and the following tabulated results were observed.

| Low Temp. Flex. | Volatility | Inflammability | Abrasion Resistance | Oil Resistance |
|---|---|---|---|---|
| −41° C. | 5.8% | Non-inflam. | 75 | 5.0% |

The results of this example show that polyvinyl chloride compositions plasticized with 2-ethylhexyl diphenyl phosphate possess the combination of the most desirable characteristics for plasticized compositions, namely, those of good low-temperature flexibility, low volatility loss of the plasticizer and non-inflammability. Moreover, the plasticized composition exhibited an improved resistance to oil absorption which is highly desirable and unexpected, for the reason that plasticizers imparting good low-temperature flexibility characteristics frequently have very poor resistance to oil absorption. It is also pointed out that the loss due to abrasion wear was only about one-half of that of the polyvinyl chloride compositions plasticized with dioctyl phthalate, dibutyl sebacate or tricresyl phosphate.

Example II

Three parts by weight of a copolymer of vinyl chloride with vinyl acetate (combined vinyl chloride approximately 94% by weight) were intimately mixed with 2 parts by weight of n-decyl diphenyl phosphate, and the mixture was worked on a differential speed roll mill with one roll at a temperature of 140° C. until a homogenous composition had been formed. A portion of this composition was molded to form a sheet of 40 mil thickness and the evaluation tests on this sheet gave the following results.

| Low Temp. Flex. | Volatility | Inflammability | Abrasion Resistance | Oil Resistance |
|---|---|---|---|---|
| −41° C. | 1.7% | Non-inflam. | 89 | 14.6% |

Again the desired result was obtained, that of the combination of good low-temperature flexibility, low volatility and flame proofing. While the oil absorption value increased, it is still much below the values for the customary low-temperature flexibilizing plasticizer, and again the superiority with respect to abrasion resistance is recognized.

Example III

Three parts by weight of polymerized vinyl chloride were intimately mixed with 2 parts by weight of lauryl diphenyl phosphate and the mixture was worked on a roll mill at 140° C. until a homogeneous composition had been formed. A portion of this composition was then molded into a sheet of 40 mil thickness and when this sheet was evaluated it exhibited the following properties:

| Low Temp. Flex. | Volatility | Inflammability | Abrasion Resistance | Oil Resistance |
|---|---|---|---|---|
| −44° C. | 1.4% | Non-inflam. | 72 | 15.4% |

Again the object of this invention was attained, that of imparting to plasticized polyvinyl resin compositions, by means of a single plasticizer, the combination of characteristics of low-temperature flexibility, low volatility of the plasticizer and non-inflammability. While the oil absorption value has increased, it is still comparable to or below that of the values determined for the usual low-temperature flexibilizing plasticizer. Moreover, these examples show how particularly advantageous the 2-ethylhexyl diphenyl phosphate is a plasticizer.

*Example IV*

Three parts by weight of polyvinyl chloride were intimately mixed with 2 parts by weight of 2-ethylhexyl dicresyl phosphate and this mixture was worked on a roll mill at 140° C. until a homogeneous composition had been formed. A 40 mil molded sheet of this composition was evaluated with respect to the following properties:

| Low Temp. Flex. | Volatility | Inflammability | Abrasion Resistance | Oil Resistance |
|---|---|---|---|---|
| −42° C. | 2.1% | Non-inflam. | 74 | 10.0% |

The most significant improvement evidenced by this example is the lowering of the low-temperature flexibility point far below that of polyvinyl chloride resin compositions plasticized with tricresyl phosphate. Moreover, again the result of combining, by means of a single plasticizer, the desired characteristics of low-temperature flexibility, low volatility loss and non-inflammability have been achieved.

*Example V*

Three parts by weight of polyvinyl chloride were intimately mixed with 2 parts by weight of 2-methylpentyl dicresyl phosphate and this mixture was worked on a roll mill at 140° C. until a homogeneous composition had been formed. A 40 mil molded sheet of this composition was evaluated with respect to the following properties:

| Low Temp. Flex. | Volatility | Inflammability |
|---|---|---|
| −29° C. | 6.4% | Non-inflam. |

*Example VI*

Three parts by weight of polyvinyl chloride were intimately mixed with 2 parts by weight of a nonyl diphenyl phosphate and this mixture was worked on a roll mill at 140° C. until a homogeneous composition had been formed. A 40 mil molded sheet of this composition was evaluated with respect to the following properties:

| Low Temp. Flex. | Volatility | Inflammability |
|---|---|---|
| −27° C. | 6.3% | Non-inflam. |

*Example VII*

Three parts by weight of polyvinyl chloride were intimately mixed with 3 parts by weight of a nonyl diphenyl phosphate and this mixture was worked on a roll mill at 140° C. until a homogeneous composition had been formed. A 40 mil molded sheet of this composition was evaluated with respect to the following properties:

| Low Temp. Flex. | Volatility | Inflammability |
|---|---|---|
| −43° C. | 7.9% | Non-inflam. |

*Example VIII*

Seventy parts by weight of polyvinyl chloride were intimately mixed with 30 parts by weight of a nonyl diphenyl phosphate, and this mixture was worked on a roll mill at 140° C. until a homogeneous composition had been formed. A 40 mil molded sheet of this composition was evaluated with respect to the following properties:

| Low Temp. Flex. | Volatility | Inflammability |
|---|---|---|
| −6° C. | 4.3% | Non-inflam. |

*Example IX*

Three parts by weight of polyvinyl chloride were intimately mixed with 2 parts by weight of iso-octyl diphenyl phosphate and this mixture was worked on a roll mill at 140° C. until a homogeneous composition had been formed. A 40 mil molded sheet of this composition was evaluated with respect to the following properties:

| Low Temp. Flex. | Volatility | Inflammability |
|---|---|---|
| −34° C. | 7.2% | Non-inflam. |

*Example X*

Three parts by weight of a copolymer of vinyl chloride wtih vinylidene chloride (combined vinyl chloride approximately 92% by weight) were intimately mixed with 2 parts by weight of a nonyl diphenyl phosphate (wherein the nonyl radical was derived from a trimethyl substituted hexanol) and this mixture was worked on a two-roll differential speed roll mill wherein the hot roll was maintained at 140° C. until a homogeneous composition had been formed, and the composition was then sheeted off of the roll. This plasticized sheet had a low-temperature flexibility point below −30° C., showed a volatility loss of about 6% and was non-inflammable.

As stated hereinbefore, other copolymers of vinyl chloride may be plasticized with the monoalkyl diaryl phosphate plasticizers of this invention and illustrative examples are the copolymers of 95 to 85% by weight of vinyl chloride and 5 to 15% by weight of vinylidene chloride, diethyl maleate or methyl methacrylate.

The monoalkyl diaryl phosphates of the invention may be used in the preparation of organosols containing polyvinyl chloride resins, and the ordinary solvents, diluents and swelling agents which are well known to the art. Using the monoalkyl diaryl phosphates of the invention, it is possible to prepare polyvinyl chloride organosols of very high solids content and with a wide range of viscosities ranging from thin mobile liquids to heavy pastes. These polyvinyl organosols are extensively used in the casting of free films and the coating of paper and fabrics with plasticized polyvinyl chloride films.

This application is a continuation-in-part of our co-pending application No. 720,310, filed January 4, 1947, now abandoned.

We claim:

1. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of any monoalkyl diphenyl phosphate wherein the alkyl radical contains at least 6 and not more than 12 carbon atoms.

2. A plasticized composition comprising polyvinyl chloride and 20 to 60% of a monoalkyl diphenyl phosphate wherein the alkyl radical contains at least 6 and not more than 12 carbon atoms.

3. A plasticized composition comprising polyvinyl chloride and 30 to 45% of a monoalkyl diphenyl phosphate wherein the alkyl radical contains at least 6 and not more than 12 carbon atoms.

4. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of an octyl diphenyl phosphate.

5. A plasticized composition comprising polyvinyl chloride and 20 to 60% of octyl diphenyl phosphate.

6. A plasticized composition comprising polyvinyl chloride and 30 to 45% of 2-ethylhexyl diphenyl phosphate.

7. A plasticized composition comprising polyvinyl chloride and 20 to 35% of 2-ethylhexyl diphenyl phosphate.

8. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of 2-ethylhexyl diphenyl phosphate.

9. A plasticized polyvinyl chloride composition comprising a polyvinyl chloride resin selected from the group consisting of polyvinyl chloride and copolymers vinyl chloride and unsaturated materials copolymerizable therewith and containing at least 85% of combined vinyl chloride, and containing 30 to 45% by weight of 2-ethylhexyl diphenyl phosphate.

10. A plasticized composition comprising polyvinyl chloride and 20 to 60% by weight of 2-ethylhexyl diphenyl phosphate.

11. A plasticized composition comprising polyvinyl chloride and 20 to 60% of a monoalkyl dicresyl phosphate wherein the alkyl radical contains at least 6 and not more than 12 carbon atoms.

12. A plasticized composition comprising polyvinyl chloride and 30 to 45% of a monoalkyl dicresyl phosphate wherein the alkyl radical contains at least 6 and not more than 12 carbon 13. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of any monoalkyl dicresyl phosphate wherein the alkyl radical contains at least 6 and not more than 12 carbon atoms.

14. A plasticized composition comprising polyvinyl chloride and 20 to 60% of octyl dicresyl phosphate.

15. A plasticized composition comprising polyvinyl chloride and 25 to 35% of 2-ethylhexyl dicresyl phosphate.

16. A plasticized polyvinyl chloride composition comprising a polyvinyl chloride resin selected from the group consisting of polyvinyl chloride and copolymers vinyl chloride and unsaturated materials copolymerizable therewith and containing at least 85% of combined vinyl chloride, and containing 20 to 60% by weight of 2-ethylhexyl dicresyl phosphate.

17. A plasticized composition comprising polyvinyl chloride and 30 to 45% by weight of 2-ethylhexyl dicresyl phosphate.

18. A plasticized polyvinyl chloride composition comprising a polyvinyl chloride resin selected from the group consisting of polyvinyl chloride and copolymers vinyl chloride and unsaturated materials copolymerizable therewith and containing at least 85% of combined vinyl chloride, and containing 20 to 60% by weight of lauryl diphenyl phosphate.

19. A plasticized elastomeric polyvinyl chloride composition comprising (1) 100 parts by weight of a polyvinyl chloride resin selected from the group consisting of (a) polyvinyl chloride and (b) copolymers of predominantly vinyl chloride and unsaturated materials copolymerizable therewith and (2) 25 to 150 parts by weight of a monoalkyl diaryl phosphate ester selected from the group consisting of monoalkyl diphenyl phosphate esters and monoalkyl dicresyl phosphate esters wherein the said monoalkyl groups contain at least 6 and not more than 12 carbon atoms.

20. A plasticized polyvinyl chloride composition comprising (1) 100 parts by weight of a polyvinyl chloride resin selected from the group consisting of (a) polyvinyl chloride and (b) copolymers of vinyl chloride and unsaturated materials copolymerizable therewith and containing at least 85% of combined vinyl chloride, and (2) about 40 to 80 parts by weight of a monoalkyl diaryl phosphate ester selected from the group consisting of monoalkyl diphenyl phosphate esters and monoalkyl dicresyl phosphate esters wherein the said monoalkyl groups contain at least 6 and not more than 12 carbon atoms.

HARRY R. GAMRATH.
JOHN KENNETH CRAVER.

REFERENCES CITED

The following references are of record in the file of this patent:

UNITED STATES PATENTS

| Number | Name | Date |
|---|---|---|
| 2,168,587 | Shuman | Aug. 8, 1939 |

OTHER REFERENCES

Industrial and Engineering Chemistry 1933, 25 page 648